United States Patent
Betz et al.

(10) Patent No.: US 7,567,976 B1
(45) Date of Patent: Jul. 28, 2009

(54) MERGING OBJECTS IN A FACTS DATABASE (75) Inventors: Jonathan T. Betz, Summit, NJ (US);
Andrew William Hogue, Pompton Lakes, NJ (US)

(73) Assignee: Google Inc., Mountain View, CA (US)

( * ) Notice: Subject to any disclaimer, the term of this patent is extended or adjusted under 35 U.S.C. 154(b) by 290 days.

(21) Appl. No.: 11/142,740

(22) Filed: May 31, 2005

(51) Int. Cl.
G06F 7/00 (2006.01)
G06F 17/30 (2006.01)
G06F 17/00 (2006.01)

(52) U.S. Cl. .................. 707/102; 706/48; 706/50; 707/6

(58) Field of Classification Search .............. 705/28; 706/20, 50; 707/1, 2, 3, 100, 102; 710/11; 725/46

See application file for complete search history.

(56) References Cited

U.S. PATENT DOCUMENTS

| | | | | |
|---|---|---|---|---|
| 5,010,478 A * | 4/1991 | Deran | ............... | 707/100 |
| 5,519,608 A * | 5/1996 | Kupiec | ............... | 704/9 |
| 5,717,951 A * | 2/1998 | Yabumoto | ............... | 710/11 |
| 5,822,743 A * | 10/1998 | Gupta et al. | ............... | 706/50 |
| 6,044,366 A * | 3/2000 | Graffe et al. | ............... | 707/2 |
| 6,134,555 A * | 10/2000 | Chadha et al. | ............... | 707/102 |
| 6,212,526 B1 * | 4/2001 | Chaudhuri et al. | ............... | 707/102 |
| 6,311,194 B1 * | 10/2001 | Sheth et al. | ............... | 715/236 |
| 6,502,102 B1 * | 12/2002 | Haswell et al. | ............... | 707/102 |
| 6,804,667 B1 * | 10/2004 | Martin | ............... | 707/6 |
| 7,020,662 B2 * | 3/2006 | Boreham et al. | ............... | 707/104.1 |
| 7,305,380 B1 * | 12/2007 | Hoelzle et al. | ............... | 707/3 |
| 7,363,312 B2 * | 4/2008 | Goldsack | ............... | 707/102 |
| 2002/0087567 A1 * | 7/2002 | Spiegler et al. | ............... | 707/100 |
| 2002/0178448 A1 * | 11/2002 | Te Kiefte et al. | ............... | 725/46 |
| 2003/0058706 A1 * | 3/2003 | Okamoto et al. | ............... | 365/200 |
| 2003/0177110 A1 * | 9/2003 | Okamoto et al. | ............... | 707/3 |
| 2003/0182310 A1 * | 9/2003 | Charnock et al. | ............... | 707/104.1 |
| 2004/0088292 A1 * | 5/2004 | Dettinger et al. | ............... | 707/4 |
| 2004/0128624 A1 * | 7/2004 | Arellano et al. | ............... | 715/530 |
| 2004/0153456 A1 * | 8/2004 | Charnock et al. | ............... | 707/10 |
| 2004/0199923 A1 * | 10/2004 | Russek | ............... | 719/310 |
| 2005/0086222 A1 * | 4/2005 | Wang et al. | ............... | 707/5 |
| 2005/0125311 A1 * | 6/2005 | Chidiac et al. | ............... | 705/28 |
| 2005/0240615 A1 * | 10/2005 | Barsness et al. | ............... | 707/102 |
| 2006/0074824 A1 * | 4/2006 | Li | ............... | 706/20 |
| 2006/0253418 A1 * | 11/2006 | Charnock et al. | ............... | 707/1 |

(Continued)

OTHER PUBLICATIONS

Pawson, Dave, Sorting and Grouping, Feb. 7, 2004, pp. 1-19, <http://web.archive.org/web/20040207163610/http://www.dpawson.co.uk/xsl/sect2/N6280.html>.*

(Continued)

*Primary Examiner*—Pierre M Vital
*Assistant Examiner*—Christopher P Nofal
(74) *Attorney, Agent, or Firm*—Morgan, Lewis & Bockius LLP (57) ABSTRACT

A key attribute may be selected for a set of objects in a fact repository. A candidate attribute is identified and objects having an attribute-value pair with the candidate attribute are gathered. The candidate attribute is selected as a key attribute if the names of the gathered objects and the values of the objects for the candidate attribute satisfy predefined criteria. For instance, objects may be merged into one object if they have same or similar names and have the same value for a key attribute.

12 Claims, 5 Drawing Sheets

U.S. PATENT DOCUMENTS

2006/0293879 A1* 12/2006 Zhao et al. .................. 704/9
2007/0005593 A1* 1/2007 Self et al. .................... 707/6
2007/0198480 A1* 8/2007 Hogue et al. ................. 707/3

OTHER PUBLICATIONS

Sun Microsystems, Attribute Names, Feb. 17, 2004, Sun, pp. 1-2. <http://java.sun.com/products/jndi/tutorial/basics/directory/attrnames.html>.*

Shannon, C.E., et al., "The Mathematical Theory of Communication," The Bell System Technical Journal, vol. 27, pp. 379-423, 623-656, Jul. Oct. 1948.

Cover, T.M., et al., "Elements of Information Theory," Wiley-InterScience, New York, NY, 1991, pp. 12-23.

Gray, R.M., "Entropy and Information Theory," Springer-Verlag, New York, NY, 1990, pp. 17-46.

MacKay, D.J.C., "Information Theory, Inference and Learning Algorithms," Cambridge University Press, 2003, pp. 22-33, 138-140.

* cited by examiner

MERGING OBJECTS IN A FACTS DATABASE

RELATED APPLICATIONS

This application is related to the following applications, each of which is hereby incorporated by reference:

U.S. patent application Ser. No. 11/097,688, "Corroborating Facts Extracted from Multiple Sources," filed on Mar. 31, 2005;

U.S. patent application Ser. No. 11/097,690, "Selecting the Best Answer to a Fact Query from Among a Set of Potential Answers," filed on Mar. 31, 2005;

U.S. patent application Ser. No. 11/097,689, "User Interface for Facts Query Engine with Snippets from Information Sources that Include Query Terms and Answer Terms," filed on Mar. 31, 2005;

U.S. patent application Ser. No. 11/142,853, "Learning Facts from Semi-Structured Text," filed on May 31, 2005;

U.S. patent application Ser. No. 11/142,748, "System for Ensuring the Internal Consistency of a Fact Repository," filed on May 31, 2005; and U.S. patent application Ser. No. 11/142,765, "Identifying the Unifying Subject of a Set of Facts," filed on May 31, 2005.

TECHNICAL FIELD

The disclosed embodiments relate generally to fact databases. More particularly, the disclosed embodiments relate to identifying primary keys for facts and merging objects based on similar names and values for the primary keys.

BACKGROUND

The World Wide Web (also known as the "Web") and the web pages within the Web are a vast source of factual information. Users may look to web pages to get answers to factual questions, such as "what is the capital of Poland" or "what is the birth date of George Washington." The factual information included in web pages may be extracted and stored in a fact database.

A fact database system may, at times, extract and store information that is redundant. Reduction of redundancy in the fact database improves the quality of the fact database. However, the fact database system may not know that the redundant information stored within is in fact redundant. Without knowing which information is redundant, efforts to reduce the redundancy of the fact database become more difficult.

Accordingly, it is desirable to provide methods and systems that can reduce redundancy in a fact database.

SUMMARY

According to an aspect of the invention, a method of processing objects includes accessing a set of objects, each object having a name and a set of one or more attribute-value pairs; identifying a candidate attribute in the attribute-value pairs; identifying a candidate subset of the set of objects, each object of the candidate subset including a respective attribute-value pair having the candidate attribute; and selecting the candidate attribute as a key attribute of the set of objects if the attribute-value pairs in the candidate subset of objects meet predefined criteria with respect to the names of the objects in the candidate subset of objects.

BRIEF DESCRIPTION OF THE DRAWINGS

Like reference numerals refer to corresponding parts throughout the drawings.

DESCRIPTION OF EMBODIMENTS

In a schema-agnostic fact repository, each fact is an arbitrary piece of information extracted from a document and associated with an arbitrary entity. Because the facts and entities are all arbitrary, from the perspective of the fact repository, the system may have difficulty recognizing, in the absence of an exact one-to-one correspondence, that two entities (and their associated facts) in the system are actually the same and may be merged into one. The term "arbitrary" is used here to mean that the facts and entities need not comply with any particular set of patterns or rules. Allowing a fact repository to store arbitrary facts, associated with arbitrary entities, enables the fact repository to grow and change over time without any preconceptions as to what constitutes facts suitable for storage in the fact repository. Key fact types may be identified for entities in the fact repository system. Using the key fact types, entities that have same or similar names and have the same value for the key fact type may be inferred to be the same entity and merged into one.

Figure 1:
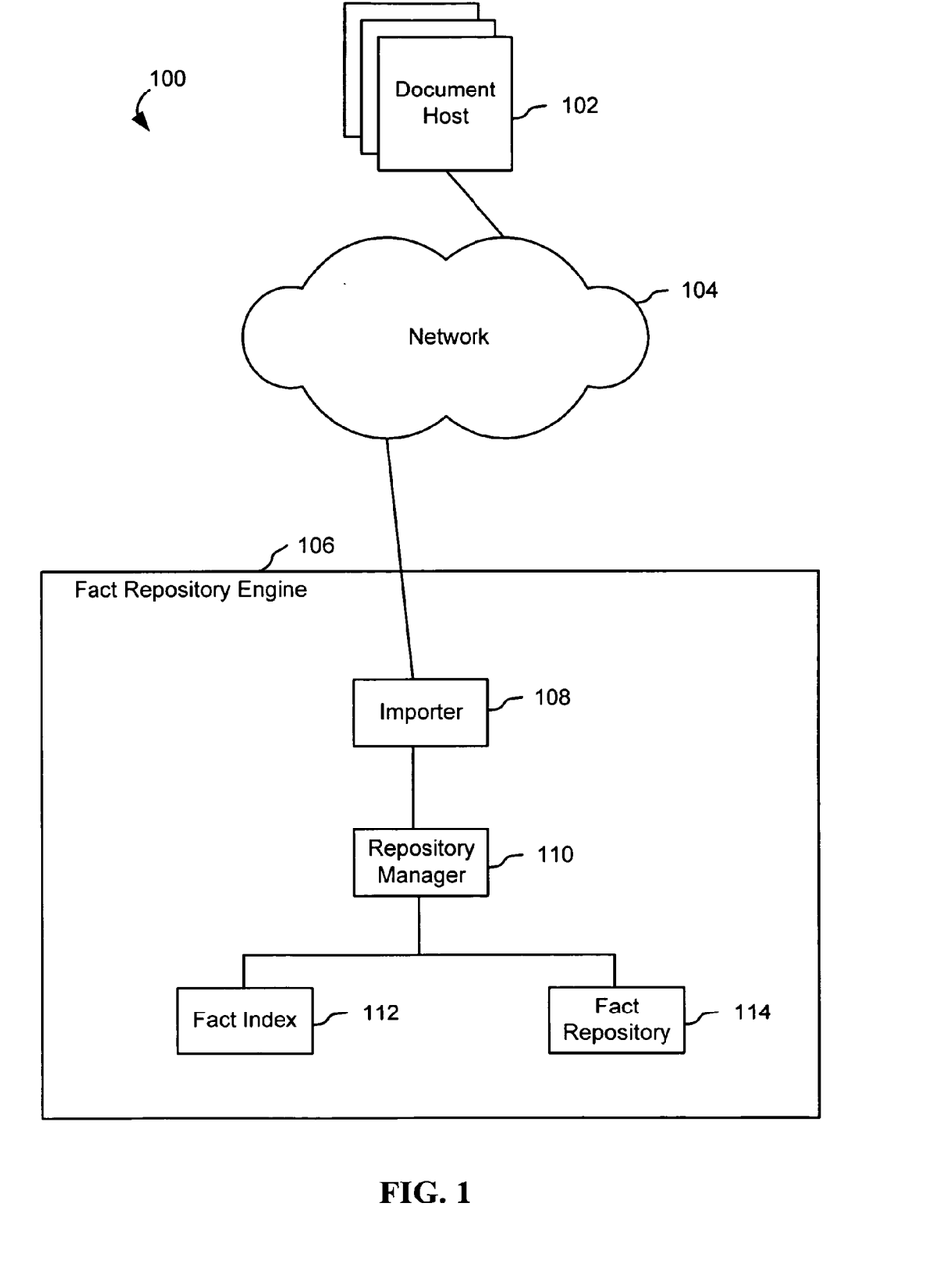
FIG. 1 illustrates a network, according to some embodiments of the invention.

FIG. 1 illustrates a network 100, according to some embodiments of the invention. Network 100 includes one or more document hosts 102 and a fact repository engine 106. The network 100 also includes one or more networks 104 that couple these components.

The document hosts 102 store documents and provide access to documents. A document may be any machine-readable data including any combination of text, graphics, multimedia content, etc. In some embodiments, a document may be a combination of text, graphics and possibly other forms of information written in the Hypertext Markup Language (HTML), i.e., a web page. A document may include one or more hyperlinks to other documents. A document may include one or more facts within its contents. A document stored in a document host 102 may be located and/or identified by a Uniform Resource Locator (URL), or Web address, or any other appropriate form of identification and/or location.

The fact repository engine 106 includes an importer 108, a repository manager 110, a fact index 112, and a fact repository 114. The importer 108 extracts factual information from documents stored on document hosts 102. The importer 108 analyzes the contents of the documents stored in document host 102, determines if the contents include factual information and the subject or subjects with which the factual information are associated, and extracts any available factual information within the contents.

The repository manager 110 processes facts extracted by the importer 108. The repository manager 110 builds and manages the fact repository 114 and the fact index 112. The repository manager 110 receives facts extracted by the importer 108 and stores them in the fact repository 114. The repository manager 110 may also perform operations on facts in the fact repository 114 to "clean up" the data within the fact repository 114. For example, the repository manager 110 may look through the fact repository 114 to find duplicate facts (that is, facts that convey the exact same factual information) and merge them. The repository manager 110 may also normalize facts into standard formats. The repository manager 110 may also remove unwanted facts from the fact repository 114, such as facts meeting predefined objectionable content criteria.

The fact repository 114 stores factual information extracted from a plurality of documents that are located on the document hosts 102. In other words, the fact repository 114 is a database of factual information. A document from which a particular fact may be extracted is a source document (or "source") of that particular fact. In other words, a source of a fact includes that fact within its contents. Source documents may include, without limitation, web pages. Within the fact repository 114, entities, concepts, and the like for which the fact repository 114 may have factual information stored are represented by objects. An object may have one or more facts associated with it. Each object is a collection of facts. In some embodiments, an object that has no facts associated with it (an empty object) may be viewed as a non-existent object within the fact repository 114. Within each object, each fact associated with the object is stored as an attribute-value pair. Each fact also includes a list of source documents that include the fact within its contents and from which the fact was extracted. Further details about objects and facts in the fact repository are described below, in relation to FIG. 4.

The fact index 112 provides an index to the fact repository 114 and facilitates efficient lookup of information in the fact repository 114. The fact index 112 may index the fact repository 114 based on one or more parameters. For example, the fact index 112 may have an index that maps terms (e.g., words, numbers, and the like) to records or locations within the fact repository 114. More specifically, the fact index 112 may include entries mapping every term in every object name, fact attribute and fact value of the fact repository to records or locations within the fact repository.

It should be appreciated that each of the components of the fact repository engine 106 may be distributed over multiple computers. For example, the fact repository 114 may be deployed over S servers, with a mapping function such as the "modulo S" function being used to determine which facts are stored in each of the S servers. Similarly, the fact index 112 may be distributed over multiple servers, and the importer 108 and repository manager 110 may each be distributed over multiple computers. However, for convenience of explanation, we will discuss the components of the fact repository engine 106 as though they were implemented on a single computer.

Figure 2:
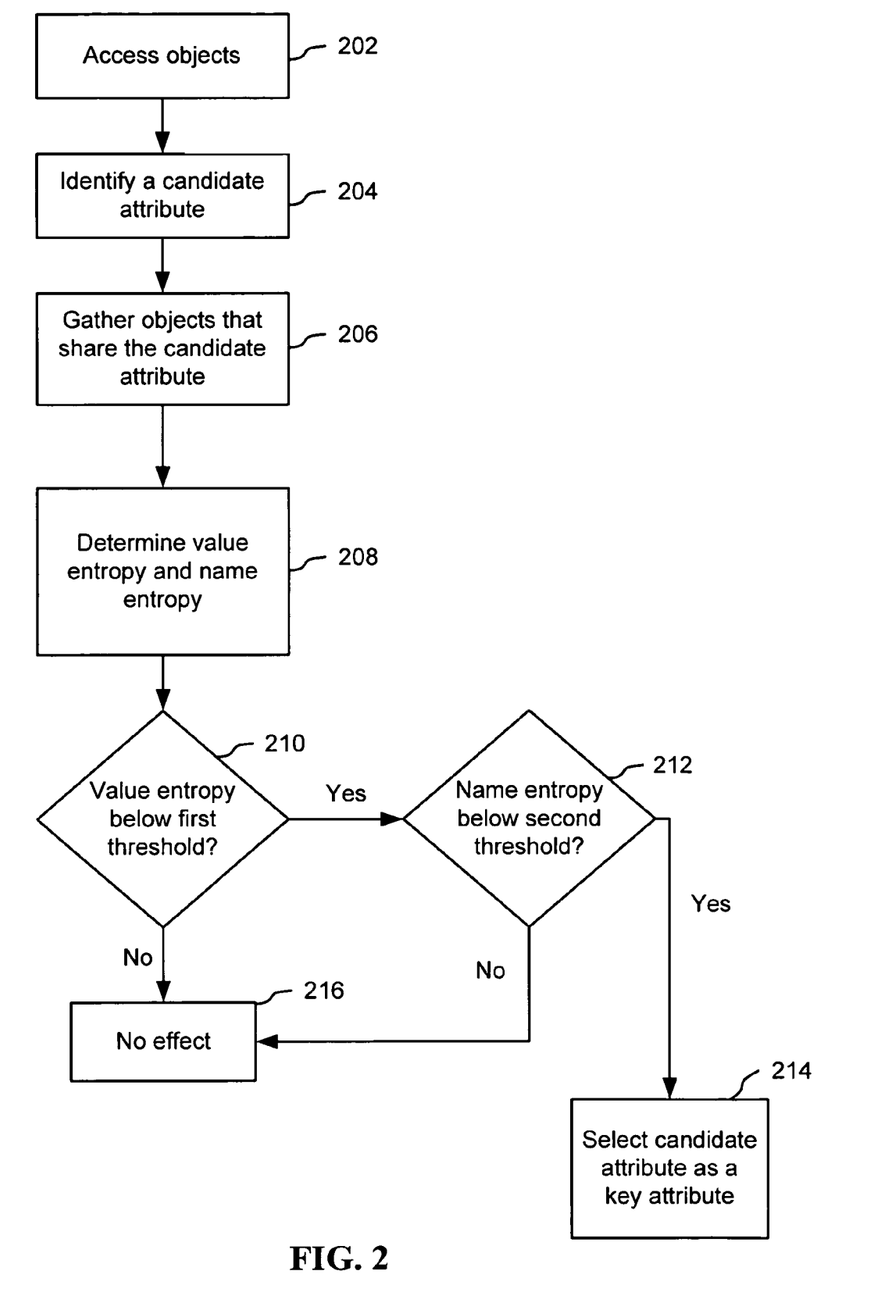
FIG. 2 is a flow diagram illustrating a process for identifying key attributes, according to some embodiments of the invention.

FIG. 2 is a flow diagram illustrating a process for identifying key attributes, according to some embodiments of the invention. A set of objects are accessed (202). Each accessed object includes at least one fact identifiable as an attribute-value pair (hereinafter A-V pair). A candidate attribute is identified (204). The candidate attribute is an attribute that is in any of the A-V pairs that are associated with any object within the set of accessed objects. However, the candidate attribute may not be a name or property attribute. Name and property attributes are described in further detail below, in relation to FIG. 4. Objects of the set that have an A-V pair with the candidate attribute are identified and gathered (206).

The names of the gathered objects and the values of A-V pairs in the gathered objects with the candidate attribute are compared against predefined criteria. The predefined criteria are based on the correlation of the values for the candidate attribute and the names of the gathered objects. In other words, the predefined criteria are defined based on how much information a value for the candidate attribute provides with respect to the object name, and vice versa. If the predefined criteria are met, the candidate attribute is selected as a key attribute (214).

In some embodiments, the predefined criteria are based on the information entropy of the values for the candidate attribute and the information entropy of the names of the objects having A-V pairs with the candidate attribute. The information entropy (or simply "entropy") of a variable measures the uncertainty of the variable. The entropy of variable x, with possible outcomes 1 to m, is defined as:

$$H(x) = -\sum_{i=1}^{m} p(i)\log_2 p(i),$$

where p(i) is the probability of outcome i.

In some embodiments, a value entropy and a name entropy are determined with respect to the candidate attribute, based on the gathered objects (208), and both the value entropy and the name entropy are compared against respective predefined thresholds. The value entropy is the entropy of the values for the attribute-value pairs having the candidate attribute. In other words, the value entropy is:

$$H(V) = -\sum_{values} p(\text{value})\log_2 p(\text{value}),$$

where p(value) (hereinafter called "value probability" for convenience) is the number of occurrences of a particular value for the candidate attribute divided by the number of gathered objects. If an object has multiple occurrences of the candidate attribute-value pair, with the same value for all of them, then that counts as only one occurrence, rather than multiple occurrences. In other words, the value probability is the probability of the value occurring amongst the gathered objects, assuming that there are no redundant A-V pairs within an object.

Figure 4:
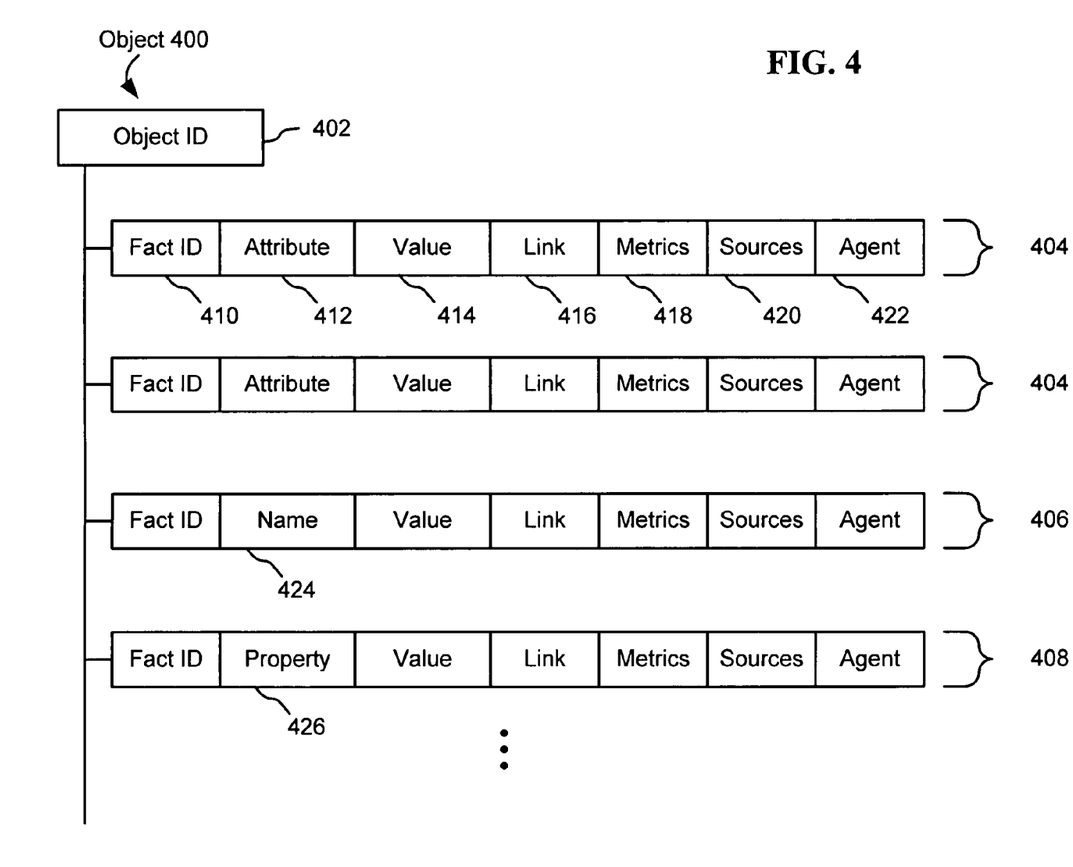
FIG. 4 illustrates a data structure for an object and associated facts in a fact repository, according to some embodiments of the invention.

The name entropy is the entropy of the names of the gathered objects. In other words, the name entropy is:

$$H(N) = -\sum_{names} p(\text{name})\log_2 p(\text{name}),$$

where p(name) (hereinafter called "name probability" for convenience) is the number of occurrences of a particular gathered object name divided by the number of gathered objects. The number of occurrences of a particular gathered object name includes gathered object names that are exact matches and gathered object names that are similar. Two objects have similar names if the degree of similarity between the names of the two objects satisfies predefined similarity criteria. In some embodiments, the similarity criterion is that the edit distance, which measures the number of operations needed to transform one string to another, between the names of the two objects is less than a predefined edit distance threshold. In some embodiments, an object may have more than one name, further details of which are described in relation to FIG. 4. For such objects, only the primary names are considered in the name entropy determination.

In some other embodiments, instead of determining H(V) and H(N) at block 208 and comparing these two entropies against respective predefined thresholds, conditional entropies H(V|N) and H(N|V) are determined (with respect to the candidate attribute), and the conditional entropies are compared against respective predefined thresholds. Conditional value entropy H(V|N) measures the average uncertainty of the value V when the name N is known. The formula for H(V|N) is:

$$H(V \mid N) = -\sum_{names} p(name) \sum_{values} p(value \mid name) \log_2 p(value \mid name),$$

where p(value|name) is the conditional value probability given a particular gathered object name.

Similarly, the formula for conditional name entropy H(N|V) is:

$$H(N \mid V) = -\sum_{values} p(value) \sum_{names} p(name \mid value) \log_2 p(name \mid value),$$

where p(name|value) is the conditional name probability given a particular value for the candidate attribute.

In further other embodiments, instead of determining two entropies (unconditional or conditional) at block 208 and comparing them against respective predefined thresholds, either of two measures related to information entropy may be determined and compared against a respective predefined threshold. In some embodiments, the measure determined is the joint entropy (with respect to the candidate attribute):

$$H(V, N) = H(N, V) = -\sum_{names} \sum_{values} p(name, value) \log_2 p(name, value),$$

where p(name, value) is the joint probability of the value for the candidate attribute and the gathered object name.

The other measure that may be determined is the mutual information (with respect to the candidate attribute), which measures the reduction in the uncertainty of N resulting from learning about V, or vice versa:

$$I(V, N) = I(N, V) = \sum_{names} \sum_{values} p(name, value) \log_2 \frac{p(name, value)}{p(name) p(value)}.$$

It should be appreciated that H(V,N)=H(N,V)=H(N)+H(V|N)=H(V)+H(N|V), and that I(V,N)=H(V)−H(V|N)=H(N)−H(N|V). Thus, in practice, the determination of the joint entropy or mutual information may be determined by first determining the appropriate entropies and/or conditional entropies and then performing addition or subtraction operations on them.

For more information on entropy, conditional entropy, joint entropy, and mutual information and their computation, see, for example, Shannon, "A Mathematical Theory of Communication," *Bell System Technical Journal*, July and October 1948; Cover et al., *Elements of Information Theory*, Wiley-Interscience, New York, 1991; Gray, *Entropy and Information Theory*, Springer-Verlag, New York, 1990; and MacKay, *Information Theory, Inference, and Learning Algorithms*, Cambridge University Press, 2003; each of which is hereby incorporated by reference in its entirety as background information.

The determined value and name entropies are each compared to first and second predefined thresholds, respectively. If the value entropy is less than the first predefined threshold (210—yes), then the name entropy is compared with a second predefined threshold. If the name entropy is less than the second predefined threshold (212—yes), then the candidate attribute is selected as a key attribute (214). If, however, either entropy is equal to or greater than its respective threshold (210—no, 212—no), then there is no effect on the candidate attribute (216); i.e., the candidate attribute is not selected as a key attribute.

It should be appreciated that while FIG. 2 shows the comparisons of the value and name entropies to respective thresholds performed serially, in a particular order, the two comparisons may be performed in the reverse order (name entropy first) or in parallel. The criteria are that both entropies are less than their respective thresholds; the order in which the comparisons are performed is immaterial.

If the entropies determined in block 208 are conditional name and value entropies, the comparison process is similar to the process for comparing value and name entropies. Both conditional entropies are compared to third and fourth predefined thresholds, respectively. If both are less than their respective thresholds, the candidate attribute is selected as a key attribute (214). If either conditional entropy (or both) is equal to or greater than its respective threshold, then there is no effect (216).

If the value determined in block 208 is the joint entropy, then that value is compared against a fifth predefined threshold. If the joint entropy is less than the fifth predefined threshold, the candidate attribute is selected as a key attribute (214). If the joint entropy is equal to or greater than the fifth predefined threshold, then there is no effect (216).

If the value determined in block 208 is the mutual information, then that value is compared against a sixth predefined threshold. If the mutual information is greater than the sixth predefined threshold, the candidate attribute is selected as a key attribute (214). If the mutual information is equal to or less than the sixth predefined threshold, then there is no effect (216).

It should be appreciated that the process of FIG. 2 may be repeated to identify and select additional key attributes. It is not necessary for every object in the fact repository 114 to have an A-V pair with a particular key attribute. Thus, having more than one key attribute provides greater coverage and ensures that there is at least one key attribute for most, if not all, objects in the fact repository 114.

The one or more key attributes serve as bases for inferring that two objects in the fact repository represent the same entity or concept. That is, using the values for the key attribute (and the object names, as described below in relation to FIG. 3), objects may be inferred to be redundant. The fact that the entropies for the key attributes are low (or that the mutual information is high) indicates that a value for a key attribute is sufficiently associated with a particular object name such that a plurality of objects with the same or similar name and the same value for the key attribute may be inferred to all represent the same entity or concept, and vice versa.

Figure 3:
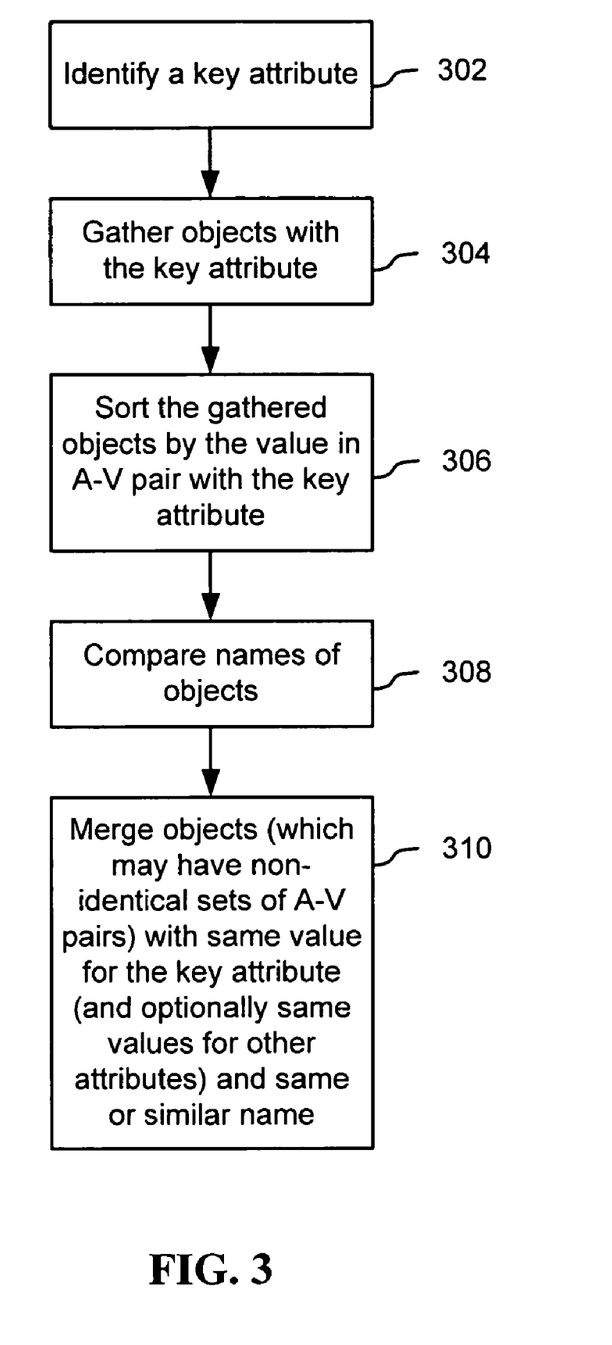
FIG. 3 is a flow diagram illustrating a process for merging objects in a fact repository, according to some embodiments of the invention.

FIG. 3 is a flow diagram illustrating a process for merging objects in a fact repository, according to some embodiments of the invention. A key attribute is identified (302). Objects having an A-V pair with the key attribute are identified and gathered (304). If the object merging process proceeds immediately after the key attribute selection process, operations 302 and 304 may be skipped because they were already performed as part of the key attribute selection process. The gathered objects are sorted by the value in their respective A-V pairs with the key attribute (306). Names of objects with the same value for the key attribute are compared (308). If two objects have the same value for the key attribute and the same or similar object name, the objects are merged into one and the set of A-V pairs for the merged object is the union of the A-V pair sets of the previously separate objects (310).

Two objects have the same name if the names of the objects match exactly. Two objects have similar names if the degree of similarity between the names of the two objects satisfies predefined similarity criteria. In some embodiments, the similarity criterion is that the edit distance, which measures the number of operations needed to transform one string to another, between the names of the two objects is less than a predefined edit distance threshold. In some embodiments, a further similarity criterion is that all the terms (e.g., "John" and "Kennedy") in one of the two object names must be found in the other object name (e.g., "John F. Kennedy"). If an object has more than one name, then the primary name is used in the matching and similarity comparison.

As described above in relation to operation 310, two objects may be merged if they have the same value for the key attribute and have the same or similar name. In some embodiments, an (optional) additional requirement for merging the two objects is that the two objects must share a predefined number of additional A-V pairs. In other words, the two objects must have at least a predefined number of A-V pairs that are the same (that is, the same value for the same attribute) across both objects, in addition to the A-V pair with the identified key attribute. This additional requirement further strengthens the inference that the two objects are the same.

It should be appreciated that operation 306 (sorting of the gathered objects) is an optional operation. However, sorting the gathered objects before proceeding to comparing names may help make the overall process more efficient.

It should be appreciated that while the description of operation 310 above describes merging objects two at a time, objects may be merged three or more at a time. Furthermore, it should be appreciated that objects to be merged into one object may have sets of A-V pairs that overlap but are not exactly identical. In other words, the objects to be merged may have sets of A-V pairs that do not have a one-to-one correspondence. When merging objects with overlapping but non-identical sets of A-V pairs, redundant A-V pairs in the merged set of A-V pairs may be merged into one A-V pair.

If two objects have the same value for the key attribute but names that are not the same or similar, further action may be taken. For example, additional names of the two objects may be compared, as the same name may be made a primary name in one object and a secondary name in the other. If the two objects have no names that are the same or similar, then they may be viewed as conflicting objects. One or both of the objects may be removed from the fact repository to resolve the conflict. If only one object is removed, the decision of which one to remove may be based on predefined criteria, such as which object has more facts with more sources and/or which object has more facts with confidence levels above a predefined confidence threshold.

FIG. 4 illustrates an exemplary data structure for an object within the fact repository 114, according to some embodiments of the invention. As described above, the fact repository 114 includes objects, each of which may include one or more facts. Each object 400 includes a unique identifier, such as the object ID 402. The object 400 includes one or more facts 404. Each fact 404 includes a unique identifier for that fact, such as a fact ID 410. Each fact 404 includes an attribute 412 and a value 414. For example, facts included in an object representing George Washington may include facts having attributes of "date of birth" and "date of death," and the values of these facts would be the actual date of birth and date of death, respectively. A fact 404 may include a link 416 to another object, which is the object identifier, such as the object ID 402 of another object within the fact repository 114. The link 416 allows objects to have facts whose values are other objects. For example, for an object "United States," there may be a fact with the attribute "president" whose value is "George W. Bush,", with "George W. Bush" being another object in the fact repository 114. In some embodiments, the value field 414 stores the name of the linked object and the link 416 stores the object identifier of the linked object. In some other embodiments, facts 404 do not include a link field 416 because the value 414 of a fact 404 may store a link to another object.

Each fact 404 also may include one or more metrics 418. The metrics may provide indications of the quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 404 includes a list of sources 420 that include the fact and from which the fact was extracted. Each source may be identified by a Uniform Resource Locator (URL), or Web address, or any other appropriate form of identification and/or location, such as a unique document identifier.

In some embodiments, some facts may include an agent field 422 that identifies the module that extracted the fact. For example, the agent may be a specialized module that extracts facts from a specific source (e.g., the pages of a particular web site, or family of web sites) or type of source (e.g., web pages that present factual information in tabular form), or a module that extracts facts from free text in documents throughout the Web, and so forth.

In some embodiments, an object 400 may have one or more specialized facts, such as a name fact 406 and a property fact 408. A name fact 406 is a fact that conveys a name for the entity or concept represented by the object 400. For example, for an object representing the country Spain, there may be a fact conveying the name of the object as "Spain." A name fact 406, being a special instance of a general fact 404, includes the same parameters as any other fact 404; it has an attribute, a value, a fact ID, metrics, sources, etc. The attribute 424 of a name fact 406 indicates that the fact is a name fact, and the value is the actual name. The name may be a string of characters. An object 400 may have one or more name facts, as many entities or concepts can have more than one name. For example, an object representing Spain may have name facts conveying the country's common name "Spain" and the official name "Kingdom of Spain." As another example, an object representing the U.S. Patent and Trademark Office may have name facts conveying the agency's acronyms "PTO" and "USPTO" and the official name "United States Patent and Trademark Office." If an object has one or more name facts, one name fact may be designated as a primary name and the other name facts may be designated as secondary names.

A property fact 408 is a fact that conveys a statement about the entity or concept represented by the object 400 that may be of interest. For example, for the object representing Spain, a property fact may convey that Spain is a country in Europe. A property fact 408, being a special instance of a general fact 404, also includes the same parameters (such as attribute, value, fact ID, etc.) as other facts 404. The attribute field 426 of a property fact 408 indicates that the fact is a property fact, and the value field is a string of text that conveys the statement of interest. For example, for the object representing Spain, the value of a property fact may be the text string "is a country in Europe." Some objects 400 may have one or more property facts while other objects may have no property facts.

It should be appreciated that the data structure illustrated in FIG. 4 and described above is merely exemplary. The data structure of the fact repository 114 may take on other forms. Other fields may be included in facts and some of the fields described above may be omitted. Additionally, each object may have additional special facts aside from name facts and property facts, such as facts conveying a type or category (for example, person, place, movie, actor, organization, etc.) for categorizing the entity or concept represented by the object. In some embodiments, an object's name(s) and/or properties may be represented by special records that have a different format than the general facts records 404 associated with the attribute-value pairs of an object.

Figure 5:
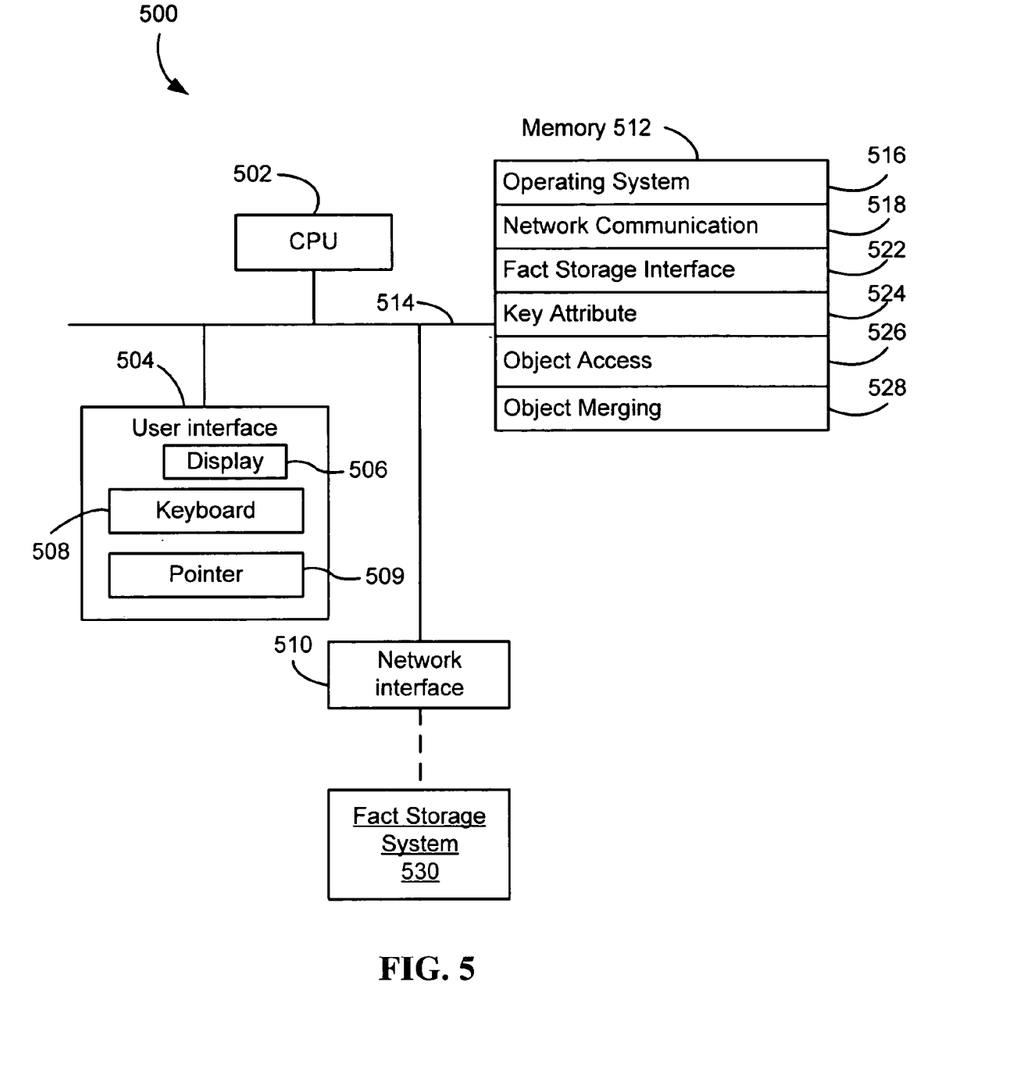
FIG. 5 illustrates an object processing system, according to some embodiments of the invention.

FIG. 5 illustrates an object processing system 500, according to some embodiments of the invention. The system 500 typically includes one or more processing units (CPU's) 502, one or more network or other communications interfaces 510, memory 512, and one or more communication buses 514 for interconnecting these components. The system 500 optionally may include a user interface 504 comprising a display device 506, keyboard 508 and pointer device 509, such as a mouse, track ball or touch sensitive pad. Memory 512 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 512 may optionally include one or more storage devices remotely located from the CPU(s) 502. In some embodiments, memory 512 stores the following programs, modules and data structures, or a subset thereof:

- an operating system 516 that includes procedures for handling various basic system services and for performing hardware dependent tasks;
- a network communication module 518 that is used for connecting the object processing system 500 to other computers via the one or more communication network interfaces 510 (wired or wireless), such as the Internet, other wide area networks, local area networks, metropolitan area networks, and so on;
- a fact storage interface (or instructions) 522 for interfacing with a fact storage system 530 (which may include a fact index and fact repository, and/or other appropriate data structures);
- a key attribute module (or instructions) 524 for identifying and selecting key attributes;
- an object access module (or instructions) 526 for accessing objects and associated attribute-value pairs; and
- an object merging module (or instructions) 528 for merging objects.

The system 500 also includes a fact storage system 530 for storing and indexing facts. As described above, in some embodiments each fact stored in the fact storage system 530 includes a corresponding list of sources from which the respective fact was extracted.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 512 may store a subset of the modules and data structures identified above. Furthermore, memory 512 may store additional modules and data structures not described above.

Although FIG. 5 shows an "object processing system," FIG. 5 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers. The actual number of servers used to implement an object processing system and how features are allocated among them will vary from one implementation to another, and may depend in part on the amount of data traffic that the system must handle during peak usage periods as well as during average usage periods, and may further depend on the size of the fact repository and the amount of fact information each server can efficiently handle.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A computer-implemented method, comprising:
    accessing a set of objects, each object having a name and a set of one or more attribute-value pairs;
    identifying a candidate attribute in the attribute-value pairs;
    identifying a candidate subset of the set of objects, each object of the candidate subset including a respective attribute-value pair having the candidate attribute;
    selecting the candidate attribute as a key attribute of the set of objects when the attribute-value pairs in the candidate subset of objects meet predefined criteria with respect to the names of the objects in the candidate subset of objects;
    identifying a first subset of the set of objects, each object in the first subset including a respective attribute-value pair having the key attribute;
    identifying a second subset of the first subset, the objects in the second subset having a same value as the respective attribute-value pair having the key attribute and having a same or similar name;
    merging the objects in the second subset to form a single object that includes attribute-value pairs from the objects in the second subset, including at least one attribute-value pair that has an attribute other than the key attribute; and storing in a database information related to the selected key attribute.

2. The method of claim 1, wherein the selecting comprises:
determining, with respect to the candidate attribute, a value entropy and a name entropy based on the candidate subset of objects, wherein name entropy is a function of a respective name of each object in the candidate subset of objects; and
selecting the candidate attribute as a key attribute of the set of objects if the value entropy is below a first predefined threshold and the name entropy is below a second predefined threshold.

3. The method of claim 1, wherein the second subset includes objects having non-identical sets of attribute-value pairs.

4. The method of claim 1, wherein the objects in the second subset have same values in one or more respective attribute-value pairs having attributes other than the key attribute.

5. A computer system for processing objects, comprising:
memory;
one or more processors; and
one or more modules, stored in the memory and executed by the one or more processors, the modules having instructions:
to access a set of objects, each object having a name and a set of one or more attribute-value pairs;
to identify a candidate attribute in the attribute-value pairs;
to identify a candidate subset of the set of objects, each object of the candidate subset including a respective attribute-value pair having the candidate attribute;
to select the candidate attribute as a key attribute of the set of objects when the attribute-value pairs in the candidate subset of objects meet predefined criteria with respect to the names of the objects in the candidate subset of objects;
to identify a first subset of the set of objects, each object in the first subset including a respective attribute-value pair having the key attribute;
to identify a second subset of the first subset, the objects in the second subset having a same value in the respective attribute-value pair having the key attribute and having a same or similar name;
to merge the objects in the second subset to form a single object that includes attribute-value pairs from the objects in the second subset, including at least one attribute-value pair that has an attribute other than the key attribute; and
to store information related to the selected key attribute in a database.

6. The system of claim 5, wherein the one or more modules include instructions:
to determine, with respect to the candidate attribute, a value entropy and a name entropy based on the candidate subset of objects, wherein name entropy is a function of a respective name of each object in the candidate subset of objects; and
to select the candidate attribute as a key attribute of the set of objects if the value entropy is below a first predefined threshold and the name entropy is below a second predefined threshold.

7. The system of claim 5, wherein the second subset includes objects having non-identical sets of attribute-value pairs.

8. The system of claim 5, wherein the objects in the second subset have same values in one or more respective attribute-value pairs having attributes other than the key attribute.

9. A computer program product for use in conjunction with a computer system, the computer program product comprising a computer readable storage medium and a computer program mechanism embedded therein, the computer program mechanism comprising instructions for:
accessing a set of objects, each object having a name and a set of one or more attribute-value pairs;
identifying a candidate attribute in the attribute-value pairs;
identifying a candidate subset of the set of objects, each object of the candidate subset including a respective attribute-value pair having the candidate attribute;
selecting the candidate attribute as a key attribute of the set of objects when the attribute-value pairs in the candidate subset of objects meet predefined criteria with respect to the names of the objects in the candidate subset of objects;
identifying a first subset of the set of objects, each object in the first subset including a respective attribute-value pair having the key attribute;
identifying a second subset of the first subset, the objects in the second subset having a same value in the respective attribute-value pair having the key attribute and having a same or similar name;
merging the objects in the second subset to form a single object that includes attribute-value pairs from the objects in the second subset, including at least one attribute-value pair that has an attribute other than the key attribute; and
storing in a database information related to the selected key attribute.

10. The computer program product of claim 9, wherein the instructions for selecting comprise instructions for:
determining, with respect to the candidate attribute, a value entropy and a name entropy based on the candidate subset of objects, wherein name entropy is a function of a respective name of each object in the candidate subset of objects; and
selecting the candidate attribute as a key attribute of the set of objects if the value entropy is below a first predefined threshold and the name entropy is below a second predefined threshold.

11. The computer program product of claim 9, wherein the second subset includes objects having non-identical sets of attribute-value pairs.

12. The computer program product of claim 9, wherein the objects in the second subset have same values in one or more respective attribute-value pairs having attributes other than the key attribute.

* * * * *